United States Patent
Schwarz, Jr.

(10) Patent No.: US 7,306,141 B1
(45) Date of Patent: *Dec. 11, 2007

(54) SYSTEM AND METHOD FOR FUNDING A COLLECTIVE ACCOUNT BY USE OF AN ELECTRONIC TAG

(75) Inventor: Charles E. Schwarz, Jr., Wilmington, DE (US)

(73) Assignee: JPMorgan Chase Bank, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/397,065

(22) Filed: Apr. 4, 2006

Related U.S. Application Data

(63) Continuation of application No. 10/937,655, filed on Sep. 9, 2004, now Pat. No. 7,051,925, which is a continuation of application No. 09/927,462, filed on Aug. 13, 2001, now Pat. No. 6,945,453.

(51) Int. Cl.
*G06F 17/00* (2006.01)
(52) U.S. Cl. .................. 235/375; 235/451; 235/379; 235/380; 235/383; 705/1; 705/14
(58) Field of Classification Search ............... 235/375, 235/379, 380, 451, 383, 384; 705/1, 14
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Pavlov et al. |
| 4,634,845 A | 1/1987 | Hale et al. |
| 4,689,478 A | 8/1987 | Hale et al. |
| 4,700,055 A | 10/1987 | Kashkashian, Jr. |
| 4,746,787 A | 5/1988 | Suto et al. |

(Continued)

FOREIGN PATENT DOCUMENTS

CA 2293321 6/1998

(Continued)

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

(Continued)

*Primary Examiner*—Steven S. Paik
(74) *Attorney, Agent, or Firm*—Hunton & Williams LLP

(57) ABSTRACT

A system and method for funding a collective account via aggregating usage of electronic tags is disclosed. The system and method promotes the use of electronic tags, and the funding of collective accounts that may be associated with charitable or other philanthropic causes. Further benefits may be realized by replenishing the prefunded account that serves as the source of funds for the electronic tag to an affinity account that also benefits the charitable or other philanthropic cause.

30 Claims, 4 Drawing Sheets

U.S. PATENT DOCUMENTS

| | | |
|---|---|---|
| 4,750,119 A | 6/1988 | Cohen et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasewaga |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Heintzeman et al. |
| 5,483,445 A | 1/1996 | Pickering |
| 5,500,514 A | 3/1996 | Veeneman et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Bloomberg et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |

| | | | | | | |
|---|---|---|---|---|---|---|
| 5,745,706 | A | 4/1998 | Wolfberg et al. | 5,953,423 | A | 9/1999 | Rosen |
| 5,749,075 | A | 5/1998 | Toader et al. | 5,953,710 | A | 9/1999 | Fleming |
| 5,760,381 | A | 6/1998 | Stich et al. | 5,955,961 | A | 9/1999 | Wallerstein |
| 5,765,138 | A | 6/1998 | Aycock et al. | 5,963,648 | A | 10/1999 | Rosen |
| 5,765,141 | A | 6/1998 | Spector | 5,970,479 | A | 10/1999 | Shepherd |
| 5,770,843 | A | 6/1998 | Rose et al. | 5,970,480 | A | 10/1999 | Kalina |
| 5,770,849 | A | 6/1998 | Novis et al. | 5,974,399 | A | 10/1999 | Giuliani et al. |
| 5,774,870 | A | 6/1998 | Storey | RE36,365 | E | 11/1999 | Levine et al. |
| 5,777,305 | A | 7/1998 | Smith et al. | 5,984,180 | A | 11/1999 | Albrecht |
| 5,777,306 | A | 7/1998 | Masuda | 5,984,191 | A | 11/1999 | Chapin, Jr. |
| 5,777,903 | A | 7/1998 | Piosenka et al. | 5,987,434 | A | 11/1999 | Libman |
| 5,778,067 | A | 7/1998 | Jones et al. | 5,988,509 | A | 11/1999 | Taskett |
| 5,787,156 | A | 7/1998 | Katz | 5,991,413 | A | 11/1999 | Arditti et al. |
| 5,787,404 | A | 7/1998 | Fernandez-Holman | 5,991,743 | A | 11/1999 | Irving et al. |
| 5,789,733 | A | 8/1998 | Jachimowicz et al. | 5,991,748 | A | 11/1999 | Taskett |
| 5,794,207 | A | 8/1998 | Walker | 5,991,750 | A | 11/1999 | Watson |
| 5,799,087 | A | 8/1998 | Rosen | 6,000,608 | A | 12/1999 | Dorf |
| 5,802,176 | A | 9/1998 | Audebert | 6,000,832 | A | 12/1999 | Franklin et al. |
| 5,805,719 | A | 9/1998 | Pare et al. | 6,002,383 | A | 12/1999 | Shimada |
| 5,806,042 | A | 9/1998 | Kelly et al. | 6,003,762 | A | 12/1999 | Hayashida |
| 5,806,044 | A | 9/1998 | Powell | 6,004,681 | A | 12/1999 | Epstein et al. |
| 5,806,045 | A | 9/1998 | Biorge | 6,006,988 | A | 12/1999 | Behrmann et al. |
| 5,807,627 | A | 9/1998 | Friend et al. | 6,009,415 | A | 12/1999 | Shurling et al. |
| 5,809,478 | A | 9/1998 | Greco | 6,014,636 | A | 1/2000 | Reeder |
| 5,815,657 | A | 9/1998 | Williams et al. | 6,014,638 | A | 1/2000 | Burge et al. |
| 5,815,658 | A | 9/1998 | Kuriyama | 6,014,645 | A | 1/2000 | Cunningham |
| 5,819,234 | A | 10/1998 | Slavin et al. | 6,014,749 | A | 1/2000 | Gloor et al. |
| 5,819,237 | A | 10/1998 | Garman | 6,016,482 | A | 1/2000 | Molinari et al. |
| 5,832,457 | A | 11/1998 | O'Brien | 6,016,954 | A | 1/2000 | Abe et al. |
| 5,832,488 | A | 11/1998 | Eberhardt | 6,019,284 | A | 2/2000 | Freeman et al. |
| 5,835,061 | A | 11/1998 | Stewart | 6,026,370 | A | 2/2000 | Jermyn |
| 5,835,576 | A | 11/1998 | Katz | 6,029,139 | A | 2/2000 | Cunningham et al. |
| 5,839,113 | A | 11/1998 | Federau et al. | 6,029,890 | A | 2/2000 | Austin |
| 5,845,259 | A | 12/1998 | West et al. | 6,032,136 | A | 2/2000 | Brake, Jr. et al. |
| 5,845,260 | A | 12/1998 | Nakano et al. | 6,036,099 | A | 3/2000 | Leighton |
| 5,852,811 | A | 12/1998 | Atkins | 6,038,292 | A | 3/2000 | Thomas |
| 5,852,812 | A | 12/1998 | Reeder | 6,038,552 | A | 3/2000 | Fleischl et al. |
| 5,857,079 | A | 1/1999 | Claus et al. | 6,041,315 | A | 3/2000 | Pollin |
| 5,857,175 | A | 1/1999 | Day | 6,045,042 | A | 4/2000 | Ohno |
| 5,857,709 | A | 1/1999 | Chock | 6,047,067 | A | 4/2000 | Rosen |
| 5,859,419 | A | 1/1999 | Wynn | 6,047,268 | A | 4/2000 | Bartoli et al. |
| 5,864,609 | A | 1/1999 | Cross et al. | 6,049,463 | A | 4/2000 | O'Malley et al. |
| 5,864,828 | A | 1/1999 | Atkins | 6,049,773 | A | 4/2000 | McCormack et al. |
| 5,864,830 | A | 1/1999 | Armetta et al. | 6,049,782 | A | 4/2000 | Gottesman et al. |
| RE36,116 | E | 2/1999 | McCarthy | 6,058,378 | A | 5/2000 | Clark et al. |
| 5,870,718 | A | 2/1999 | Spector | 6,064,985 | A | 5/2000 | Anderson |
| 5,870,721 | A | 2/1999 | Norris | 6,065,675 | A | 5/2000 | Teicher |
| 5,875,437 | A | 2/1999 | Atkins | 6,068,183 | A | 5/2000 | Freeman et al. |
| 5,883,377 | A | 3/1999 | Chapin, Jr. | 6,070,067 | A | 5/2000 | Nguyen et al. |
| 5,883,810 | A | 3/1999 | Franklin et al. | 6,070,147 | A | 5/2000 | Harms et al. |
| 5,884,271 | A | 3/1999 | Pitroda | 6,070,153 | A | 5/2000 | Simpson |
| 5,884,278 | A | 3/1999 | Powell | 6,076,068 | A | 6/2000 | DeLapa et al. |
| 5,884,285 | A | 3/1999 | Atkins | 6,076,072 | A | 6/2000 | Libman |
| 5,887,065 | A | 3/1999 | Audebert | 6,078,888 | A | 6/2000 | Johnson, Jr. |
| 5,890,138 | A | 3/1999 | Godin et al. | 6,078,891 | A | 6/2000 | Riordan et al. |
| 5,890,140 | A | 3/1999 | Clark et al. | 6,091,817 | A | 7/2000 | Bertina et al. |
| H1794 | H | 4/1999 | Claus | 6,092,056 | A | 7/2000 | Tull, Jr. et al. |
| 5,897,620 | A | 4/1999 | Walker et al. | 6,095,412 | A | 8/2000 | Bertina et al. |
| 5,905,246 | A | 5/1999 | Fajkowski | 6,095,416 | A | 8/2000 | Grant et al. |
| 5,911,135 | A | 6/1999 | Atkins | 6,098,053 | A | 8/2000 | Slater |
| 5,911,136 | A | 6/1999 | Atkins | 6,105,011 | A | 8/2000 | Morrison, Jr. |
| 5,914,472 | A | 6/1999 | Foladare et al. | 6,105,865 | A | 8/2000 | Hardesty |
| 5,920,629 | A | 7/1999 | Rosen | 6,115,458 | A | 9/2000 | Taskett |
| 5,920,844 | A | 7/1999 | Hotta et al. | 6,119,932 | A | 9/2000 | Maloney et al. |
| 5,920,847 | A | 7/1999 | Kolling et al. | 6,122,623 | A | 9/2000 | Garman |
| 5,923,734 | A | 7/1999 | Taskett | 6,128,598 | A | 10/2000 | Walker et al. |
| 5,926,800 | A | 7/1999 | Baronowski et al. | 6,128,599 | A | 10/2000 | Walker et al. |
| 5,930,217 | A | 7/1999 | Kayanuma | 6,129,274 | A | 10/2000 | Suzuki |
| 5,931,764 | A | 8/1999 | Freeman et al. | 6,134,536 | A | 10/2000 | Shepherd |
| 5,933,817 | A | 8/1999 | Hucal | 6,138,917 | A | 10/2000 | Chapin, Jr. |
| 5,937,068 | A | 8/1999 | Audebert | 6,145,741 | A | 11/2000 | Wisdom et al. |
| 5,940,811 | A | 8/1999 | Norris | 6,148,297 | A | 11/2000 | Swor et al. |
| 5,952,641 | A | 9/1999 | Korshun | 6,161,096 | A | 12/2000 | Bell |

| | | | | | | |
|---|---|---|---|---|---|---|
| 6,163,770 | A | 12/2000 | Gamble et al. | 7,051,925 B2 * | 5/2006 | Schwarz, Jr. ............... 235/375 |
| 6,164,533 | A | 12/2000 | Barton | 2001/0011243 A1 | 8/2001 | Dembo et al. |
| 6,167,385 | A | 12/2000 | Hartley-Urquhart | 2001/0027441 A1 | 10/2001 | Wankmueller |
| 6,169,975 | B1 | 1/2001 | White et al. | 2001/0034682 A1 | 10/2001 | Knight et al. |
| 6,173,267 | B1 | 1/2001 | Cairns | 2001/0037315 A1 | 11/2001 | Saliba et al. |
| 6,182,048 | B1 | 1/2001 | Osborn et al. | 2001/0044293 A1 | 11/2001 | Morgan |
| 6,182,894 | B1 | 2/2001 | Hackett et al. | 2001/0047342 A1 | 11/2001 | Cuervo |
| 6,186,793 | B1 | 2/2001 | Brubaker | 2001/0054003 A1 | 12/2001 | Chien et al. |
| 6,189,787 | B1 | 2/2001 | Dorf | 2001/0056398 A1 | 12/2001 | Scheirer |
| 6,195,644 | B1 | 2/2001 | Bowie | 2002/0019803 A1 | 2/2002 | Muller |
| 6,202,053 | B1 | 3/2001 | Christiansen et al. | 2002/0026418 A1 | 2/2002 | Koppel et al. |
| RE37,122 | E | 4/2001 | Levine et al. | 2002/0046255 A1 | 4/2002 | Moore et al. |
| 6,227,447 | B1 | 5/2001 | Campisano | 2002/0062235 A1 | 5/2002 | Wahlbin et al. |
| 6,243,688 | B1 | 6/2001 | Kalina | 2002/0077978 A1 | 6/2002 | O'Leary et al. |
| 6,263,316 | B1 | 7/2001 | Khan et al. | 2002/0091572 A1 | 7/2002 | Anderson et al. |
| 6,265,977 | B1 | 7/2001 | Vega et al. | 2002/0091631 A1 | 7/2002 | Usui |
| 6,278,981 | B1 | 8/2001 | Dembo et al. | 2002/0095365 A1 | 7/2002 | Slavin et al. |
| 6,295,522 | B1 | 9/2001 | Boesch | 2002/0104878 A1 | 8/2002 | Seifert et al. |
| 6,298,336 | B1 | 10/2001 | Davis et al. | 2002/0116271 A1 | 8/2002 | Mankoff |
| 6,308,268 | B1 | 10/2001 | Audebert | 2002/0116330 A1 | 8/2002 | Hed et al. |
| 6,336,099 | B1 | 1/2002 | Barnett et al. | 2002/0120627 A1 | 8/2002 | Mankoff |
| 6,341,724 | B2 | 1/2002 | Campisano | 2002/0120642 A1 | 8/2002 | Fetherston |
| 6,343,743 | B1 | 2/2002 | Lamla | 2002/0143703 A1 | 10/2002 | Razvan et al. |
| 6,345,261 | B1 | 2/2002 | Feidelson | 2002/0147662 A1 | 10/2002 | Anderson |
| 6,345,766 | B1 | 2/2002 | Taskett et al. | 2002/0165820 A1 | 11/2002 | Anvekar et al. |
| 6,349,291 | B1 | 2/2002 | Varma | 2002/0174016 A1 | 11/2002 | Cuervo |
| 6,360,954 | B1 | 3/2002 | Barnardo | 2003/0004828 A1 | 1/2003 | Epstein |
| 6,366,220 | B1 | 4/2002 | Elliott | 2003/0023549 A1 | 1/2003 | Armes et al. |
| 6,373,969 | B1 | 4/2002 | Adler | 2003/0028518 A1 | 2/2003 | Mankoff |
| 6,377,669 | B1 | 4/2002 | Walker et al. | 2003/0033211 A1 | 2/2003 | Haines et al. |
| 6,385,591 | B1 | 5/2002 | Mankoff | 2003/0033246 A1 | 2/2003 | Slater |
| 6,386,444 | B1 | 5/2002 | Sullivan | 2003/0046249 A1 | 3/2003 | Wu |
| 6,397,202 | B1 | 5/2002 | Higgins et al. | 2003/0053609 A1 | 3/2003 | Risafi et al. |
| 6,402,039 | B1 | 6/2002 | Freeman et al. | 2003/0101119 A1 | 5/2003 | Persons et al. |
| 6,405,182 | B1 | 6/2002 | Cuervo | 2003/0105672 A1 | 6/2003 | Epstein et al. |
| 6,422,459 | B1 | 7/2002 | Kawan | 2003/0135462 A1 | 7/2003 | Brake, Jr. et al. |
| 6,422,462 | B1 | 7/2002 | Cohen | 2003/0140004 A1 | 7/2003 | O'Leary et al. |
| 6,424,029 | B1 | 7/2002 | Giesler | 2003/0144935 A1 | 7/2003 | Sobek |
| 6,429,927 | B1 | 8/2002 | Borza | 2003/0154125 A1 | 8/2003 | Mittal et al. |
| 6,434,259 | B1 | 8/2002 | Hamid et al. | 2003/0163403 A1 | 8/2003 | Chen et al. |
| 6,446,210 | B1 | 9/2002 | Borza | 2003/0163416 A1 | 8/2003 | Kitajima |
| 6,450,407 | B1 | 9/2002 | Freeman et al. | 2003/0172040 A1 | 9/2003 | Kemper et al. |
| 6,463,039 | B1 | 10/2002 | Ricci et al. | 2003/0195808 A1 | 10/2003 | Brown et al. |
| 6,467,684 | B2 | 10/2002 | Fite et al. | 2003/0200143 A9 | 10/2003 | Walker et al. |
| 6,473,500 | B1 | 10/2002 | Risafi et al. | 2003/0200180 A1 | 10/2003 | Phelan et al. |
| 6,484,144 | B2 | 11/2002 | Martin et al. | 2003/0216965 A1 | 11/2003 | Libman |
| 6,484,148 | B1 | 11/2002 | Boyd | 2004/0024672 A1 | 2/2004 | Brake, Jr. et al. |
| 6,498,861 | B1 | 12/2002 | Hamid et al. | 2004/0030626 A1 | 2/2004 | Libman |
| 6,505,168 | B1 | 1/2003 | Rothman et al. | 2004/0039588 A1 | 2/2004 | Libman |
| 6,560,578 | B2 | 5/2003 | Eldering | 2004/0098351 A1 | 5/2004 | Duke |
| 6,574,603 | B1 | 6/2003 | Dickson et al. | 2004/0243498 A1 | 12/2004 | Duke |
| 6,581,839 | B1 | 6/2003 | Lasch et al. | 2005/0021400 A1 | 1/2005 | Postrel |
| 6,601,761 | B1 | 8/2003 | Katis | 2005/0027649 A1 | 2/2005 | Cech |
| 6,609,111 | B1 | 8/2003 | Bell | 2005/0071230 A1 | 3/2005 | Mankoff |
| RE38,255 | E | 9/2003 | Levine et al. | 2005/0075932 A1 | 4/2005 | Mankoff |
| 6,615,189 | B1 | 9/2003 | Phillips et al. | 2005/0091138 A1 | 4/2005 | Awatsu |
| 6,615,190 | B1 | 9/2003 | Slater | 2005/0171898 A1 | 8/2005 | Bishop et al. |
| 6,625,582 | B2 | 9/2003 | Richman et al. | | | |
| 6,631,849 | B2 | 10/2003 | Blossom | | | |
| 6,641,049 | B2 | 11/2003 | Luu | | | |
| 6,641,050 | B2 | 11/2003 | Kelley et al. | | | |
| 6,675,127 | B2 | 1/2004 | LaBlanc et al. | | | |
| 6,693,544 | B1 | 2/2004 | Hebbecker | | | |
| 6,742,704 | B2 | 6/2004 | Fitzmaurice et al. | | | |
| 6,745,938 | B2 | 6/2004 | Sullivan | | | |
| 6,802,008 | B1 | 10/2004 | Ikefuji et al. | | | |
| 6,805,287 | B2 | 10/2004 | Bishop | | | |
| 6,865,547 | B1 | 3/2005 | Brake, Jr. et al. | | | |
| 6,868,426 | B1 | 3/2005 | Mankoff | | | |
| 6,876,971 | B1 | 4/2005 | Burke | | | |
| 6,901,372 | B1 | 5/2005 | Helzerman | | | |
| 6,945,453 | B1 | 9/2005 | Schwarz, Jr. | | | |
| 7,006,992 | B1 | 2/2006 | Packwood | | | |

FOREIGN PATENT DOCUMENTS

| | | |
|---|---|---|
| EP | 959440 | 11/1999 |
| GB | 2275654 A | 9/1994 |
| GB | 2376787 A | 12/2002 |
| GB | 2377071 A | 12/2002 |
| GB | 2377314 A | 1/2003 |
| WO | WO94/29112 | 12/1994 |
| WO | WO97/41673 | 11/1997 |
| WO | WO98/59307 | 12/1998 |
| WO | WO99/05633 | 2/1999 |
| WO | WO 01/69347 A2 | 9/2001 |

WO  WO 2005/043277 A2   5/2005

OTHER PUBLICATIONS

Song, A Card That Asks For ID, Time Magazine, Apr. 12, 2004, 1 page.
A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard. net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology; Blockbuster Video is first merchant partner, Business Wire, Inc., Jan. 15, 1996.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying By Credit Card-Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.

E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 To Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First Data unit develops Blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http://cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Incentive Firms Find Debit Cards A Rewarding Experience (Offline debit card issuers converge efforts with companies looking for effective incentives to boost employee productivity and to motivate individuals to buy their products), Debit Cards News, Vol.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Meridian Award Cards, JA8251.
Card Based Award Systems, JA8309.
Meridian-the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.

Schwab, Charles, Now 7 Ways For A better Total Return For Your Money; Schwat 1, The Inventor's Asset Management Account, Charles R. Schwab, Charles Schwab & Co., Inc., 16 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base, American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

Stoughton, The Gift of Credit, www.washingtonpost.com/wp-srv/business, Dec. 14, 1998.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm; printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans For Cross Border Visa Cash Based On CEPS, www.visa.com/av/news/praaamisc111699.vhtml, Nov. 16, 1999.

Visa first to launch electronic purse load via GSM mobile phone, www.cellular.co.za, Johannesburg, ZA, printed Feb. 23, 2001, 4 pages.

Visa releases Visa Cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome To Card Express CardEx, CardEx website archived by web.archive on Oct. 31, 1996, http://web.archive.org/web/*/http://www.cardex.com, retrieve Oct. 18, 2003, 7 pages.

Welcome To Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

SWIFTGIFT, Welcome to Swiftgift, www.swiftgiftcard.com, Dec. 8, 1998, 10 pages.

Machlis et al., Will smart cards replace ATMS?, Computerworld, printed Feb. 23, 2001, 3 pages.

\* cited by examiner

SYSTEM AND METHOD FOR FUNDING A COLLECTIVE ACCOUNT BY USE OF AN ELECTRONIC TAG

RELATED APPLICATIONS

This is a continuation application of U.S. patent application Ser. No. 10/937,655, filed on Sep. 9, 2004 now U.S. Pat. No. 7,051,925, which is a continuation of U.S. patent application Ser. No. 09/927,462, filed on Aug. 13, 2001 and now U.S. Pat. No. 6,945,453. The contents of this application and patent are herein incorporated by reference.

FIELD OF THE INVENTION

The invention relates generally to the funding of collective accounts through the use of electronic tags ("tag" or "tags"). More specifically, the invention relates to systems and methods for funding a collective account that may be used for a variety of purposes, such as making charitable contributions or otherwise contributing to causes, based on tag usage and the "float" of a prefunded account associated with a tag.

BACKGROUND OF THE INVENTION

Electronic tags are used today to conduct various financial transactions. For instance, the Mobil® division of Exxon-Mobil Corporation sponsors a program, called SPEEDPASS® whereby a customer can purchase gas and other goods and services by activating a system with a tag containing a transponder, where the tag is associated with some source of the customer's funds which are used to pay for the purchase. The tag may be kept on a keyring, and is waved in front of a detector to activate the system.

Another popular, rapidly growing use of electronic tags is in Electronic Toll Collection ("ETC") systems including E-Z PASS,® GEORGIA CRUISE CARD, SUNPASS,® EPASS,® and FAS-TRAK,® among others, which allow a motorist to electronically charge a toll for using certain roadways without having to physically stop at a tollbooth to pay the toll. ETC systems are a part of the technology known as Intelligent Transportation Systems ("ITS") fostered by the Intelligent. Transportation Society of America ("ITSA"), a society composed of private and public members which was mandated by the United States Congress in the Intermodal Surface Transportation Efficiency Act of 1991 ("ISTEA") to coordinate the development and deployment of intelligent transportation systems in the United States. ETC systems enhance the safety, capacity, and efficiency of the tollway systems in this country, as well as improve customer service and satisfaction. In addition, ETC systems improve air quality by reducing the number of vehicles which sit at idle speed at tollbooths.

The users of these tags generally associate a prefunded account to serve as a source of funds to pay for charges made with their tags, where the prefunded account balance is referred to as the "float." These prefunded accounts are maintained by the ETC system operator, who invests the account balances and makes a profit off this "float." The user may automatically replenish the prefunded account by instructing the system to charge additional "float" to an individual checking, savings, or credit card account or other source of funds associated with the tag when the prefunded account balance reaches a low limit, or the user may manually replenish the prefunded account balance.

ETC systems operate by detecting some tag identification information associated with the tag using some type of sensor as the motorist passes through a tollbooth or otherwise activates the sensor and determining which prefunded account is associated with that tag. Tag identification information may be contained in bar coded labels, which are placed on the vehicle and detected by laser scanners at the tollbooth. Alternatively, tag identification information may be transmitted via an RF or IR or other type of transponder located in the tag, where the emitted signal is read by a reader/antenna located at the tollbooth. Often the tags are intended to be attached to the motorist's front windshield or side window by some type of adhesive, and are, for the most part, contained in generic plastic casings which many consider unattractive to display.

When the tag identification information is detected by a scanner or reader/antenna at a tollbooth, the prefunded account associated with that tag is debited the amount of the corresponding toll or charge. Annual toll revenues for the nation's toll roads which use ETC systems easily exceed one billion dollars a year,[1] so enrollment of users in the nation's ETC systems contemplates a significant "float" potentially to be held by ETC systems operators.

[1] According to data compiled during the years of 1996 through 1999 by the ETTM, a component of the Intelligent Transportation Systems (ITS). See www.ettm.com/usafac.html.

Some potential ETC users currently do not enroll in the systems because they do not want to leave their money in the prefunded account where they lose the use of the account balance, and where they are committed to spending the prefunded account balance with the ETC system operator. Further, as noted, the tags currently used are considered plain and unattractive, which may lead some motorists not to mount the tags on their windshields, creating a safety hazard as those motorists fumble to find the tag to pay the toll.

SUMMARY OF THE INVENTION

The method and system of the invention overcomes these problems of the prior art, and adds an incentive for potential users to sign up for and to use ETC tag systems. As well, the invention provides ETC systems operators an incentive to make charitable and other contributions based on the users' tag usage and "float."

It is feature of the invention to provide a method and system for funding a collective account with a reward based either on aggregate tag usage of a plurality of tags associated with that collective account or on the aggregate of prefunded account balances for a plurality of prefunded accounts associated with the collective account.

It is another feature of the invention to provide an incentive for potential users of electronic tag systems to open and prefund accounts with electronic tag system operators.

It is yet another feature of the invention to facilitate a method for electronic tag systems operators to make charitable and other financial contributions.

It is yet another feature of the invention to provide an electronic tag that will increase public awareness of charitable or other political or educational causes.

It is yet another feature of the invention to facilitate the earning of rewards in a loyalty program sponsored by or otherwise associated with a for-profit or retail program, where the tag is associated with an individual account that is associated with the loyalty program.

It is another feature of the invention to provide an additional benefit to holders of collective accounts by prefunding accounts with individual accounts that are associated with and benefit the holders of the collective accounts through affinity programs.

It is another feature of the invention to encourage use of ETC systems by motorists and thereby benefiting the environment.

It is yet another feature of the invention to increase safety at toll booths by providing an electronic tag that motorists will want to install on their windshields.

One aspect of the invention relates to a method and system for funding a collective account comprising a plurality of tags and prefunded accounts associated with those tags, associating the tags or the "float" of the prefunded accounts to the collective account, aggregating either the tag usage or the prefunded account balances, calculating a reward based on the aggregate tag usage or prefunded account balances, and funding the reward to the collective account. The funds in the collective account may be used for a variety of purposes, such as making charitable contributions, funding political campaigns, or making contributions to religious or civic groups or educational institutions.

Another aspect of the invention relates to decorating a tag with a symbol, name, or color scheme of the target organization. Not only does such decoration increase public awareness of the tagholder's chosen cause, but it also increases the likelihood that the user (if a motorist) installs the tag on the windshield of the vehicle which increases highway safety by reducing motorist distraction as he or she fumbles to locate the tag as he or she approaches the toll booth.

Another aspect of the invention relates to a method and system for associating a prefunded account for a tag with an individual account that is itself associated with a loyalty program, and increasing credits in the loyalty program through use of the electronic tag. These loyalty program credits may inure to the benefit of the tagholder, as for example where the individual account amasses cash bonuses or frequent flyer miles upon individual account usage. Alternatively, the loyalty program benefits may inure to a charitable or other organization, as where the individual account is an affinity account that makes a contribution to a chosen card based on individual account usage. Further, an organization that is the beneficiary of both an affinity program associated with an individual account associated with a tag and is also the holder of a collective account associated with the same tag may receive double benefits from tag usage.

As used in this specification, the terms "tag" and "tags" refer to any known or later developed device or object, associated in some manner to a source of funds, that may be used to activate a system for automatically making purchases of goods or services and charge the purchase of those goods or services to the associated source of funds. The associated source of funds may itself be a prefunded account, and may also be associated with at least one other source of funds, as an individual account, to replenish the prefunded account balance.

Other features and advantages of the invention will become apparent from the description of the preferred embodiments in conjunction with the following figures.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
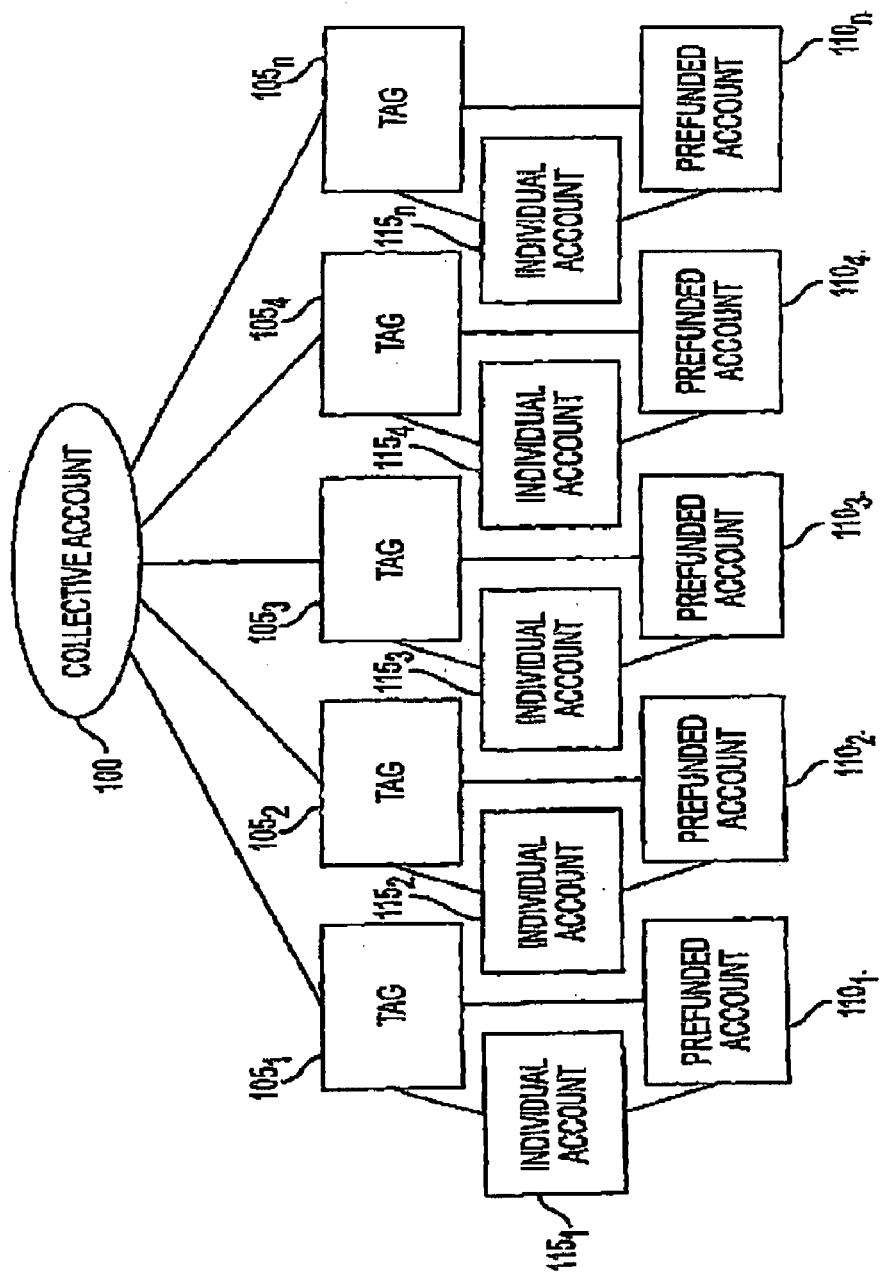
FIG. 1 is a schematic of one embodiment of the invention illustrating a plurality of tags each associated with an individual account, a prefunded account, and a collective account.

The invention relates generally to a method and system for funding a collective account through the use of electronic tags, or through profits made off the "float" of the prefunded accounts associated with those tags. One embodiment of the invention may comprise associating each of a plurality of tags to a prefunded account and a collective account, or alternatively associating the prefunded account directly to the collective account. The invention further comprises aggregating tag usage for all associated tags in the collective account. A reward may be calculated based on the aggregate tag usage for all tags associated with the collective account and the reward credited to the collective account, thus providing an incentive for tagholders to increase their use of ETC systems. The above steps can be accomplished in real time or on a periodic basis. The funds in the collective account may be used for a variety of purposes as, for example, funding of charitable, religious, political, or educational institutions. Individual tagholders may be members of the organization that is the holder of the collective account.

According to another embodiment of the invention, the reward to the collective account may be calculated based on the aggregate prefunded account balances for all prefunded accounts associated with the collective account, thus providing an incentive for tagholders to increase the "float" amounts kept in their prefunded accounts.

In another embodiment of the invention, the system operator may establish a number of collective accounts and designate each collective account for a particular purpose as an environmental purpose, charitable purpose, etc. Tagholders may associate all or a portion of their prefunded accounts and/or tag usage to one or more collective accounts. In this embodiment, it is not necessary that tagholders be members of any organization that is the holder of the collective account, and a single tagholder may associate his or her prefunded account and/or tag usage in percentages to multiple collective accounts.

Tagholders may be issued periodic reporting statements detailing the contributions made in relation to the association of their prefunded accounts and/or tags to collective accounts.

Another embodiment of the invention relates to a computer-based system for funding a collective account, wherein a tag is associated with prefunded and collective accounts. The system may include a host computer capable of programmed response and software capable of monitoring individual tag usage or prefunded account balances, aggregating tag usage or prefunded account balances, and calculating a bonus based on the aggregate tag usage or prefunded account balances of all prefunded accounts associated with a particular collective account. The computer may perform other functions as generating statements of the prefunded accounts to the tagholders and statements of the collective account to the holder of the collective account, and may also be capable of automatically initiating a funds transfer from an individual account associated with the tag and/or prefunded account to replenish the prefunded account-based upon predetermined conditions, such as low prefunded account balance. In addition, a plurality of remote computers may be networked or otherwise capable of communicating with the host computer, where the remote computers are associated with reader/antennas at tollbooths or other sites where a tag may be used to purchase a good or service. The reader/antennas may be capable of detecting tag identification information and transmitting the tag identification information along with the charge to the remote computers, which can then transmit the information to the host computer to charge the associated prefunded account for that tag. Alternatively, remote computers may access the host computer for tag identification information, and identify the prefunded account before transmission of the charge information to the host computer.

In another embodiment of the invention, the tag and prefunded account may be associated with an individual account used as a source of funds to replenish the prefunded account based on fulfillment of predetermined conditions, as for example a predetermined low balance amount in the prefunded account. The individual account may be an affinity account, where an organization receives a benefit from use of the individual account. If the affinity organization is also the holder of the collective account, that organization can realize a double benefit from a tagholder's use of the tag—both from the affinity program when the individual account is used to fund the prefunded account, and again when the reward is calculated and awarded based on tag usage. In other embodiments, the individual account may be associated with a loyalty program, where benefits accrue directly to the tagholder upon use of the individual account. In this scenario, increased tag usage benefits the holder of the collective account, and also causes increased needs to replenish the prefunded account, which then benefits the tagholder directly by increased loyalty program credits.

The presence of an LED and/or LCD readout in the tag allows the user to view such information as remaining balance in his or her prefunded account or to receive and/or view messages transmitted from the reader/antenna. The tag may also have the ability to generate a sound that indicates a successful detection by the reader/antenna or a low prefunded account balance which might be a theme song associated with the holder of the collective account, as for example the fight song of a selected university. The tag may have a communication port to allow it to communicate with other devices, as for example relaying traffic information received from the reader/antenna to a device capable of reading and mapping out the relayed information within a vehicle or some remote or hard wired device.

The holder of the collective account can be an organization comprising a plurality of members. However, the tagholders are not necessarily members of the holder of the collective account, as the tagholders may designate different causes to receive the reward. The collective account may also comprise one or more sub-accounts, where each sub-account is designated for a different purpose.

The reward may be calculated in a number of ways. For example, the reward may be based on aggregate tag usage or aggregate "float" of the prefunded account balances associated with the collective account calculated over some period of time. Alternatively, the reward may be customized by basing it on a comparison of aggregate tag usage or aggregate "float" of the prefunded account balances during a given period to historic performance, where increased performance in the given period results in a proportionately greater reward. Alternatively, a minimum performance standard may be set to achieve any reward to be credited to the collective account.

Although the invention is described in terms of electronic tags associated with prefunded accounts, collective accounts, and individual accounts, this description is not intended to limit the invention but is rather one embodiment as will be apparent to those skilled in the art.

Referring now to FIG. 1, a schematic of one embodiment of the invention is detailed for funding a collective account 100 such as a charitable contribution account. The invention comprises a plurality of tags $105_1$ through $105_n$, each tag associated with at least one prefunded account $110_1$ through $110_n$. Also, each tag may be associated with a collective account 100, as selected by the tagholder. Alternatively, each prefunded account $110_n$ may be associated directly with the collective account 100, or each tag $105_n$ may be associated with multiple collective accounts (not shown). The invention further comprises aggregating the tag usage for at least some of the tags associated with the collective account 100, calculating a reward based on the aggregate tag usage, and funding the collective account 100 with the calculated reward. Alternatively, for tags associated with multiple collective accounts, the tagholder may select the percentage of tag usage to be associated with each collective account. In other embodiments, account balances of prefunded accounts $110_1$ through $110_n$ may be aggregated for purposes of calculating the reward. The tags and prefunded accounts may also be associated with individual accounts $115_1$ through $115_n$, which may be used as a source of funds to replenish the prefunded accounts $110_1$ through $110_n$ upon fulfillment of a predetermined condition, as a low prefunded account balance.

Figure 2:
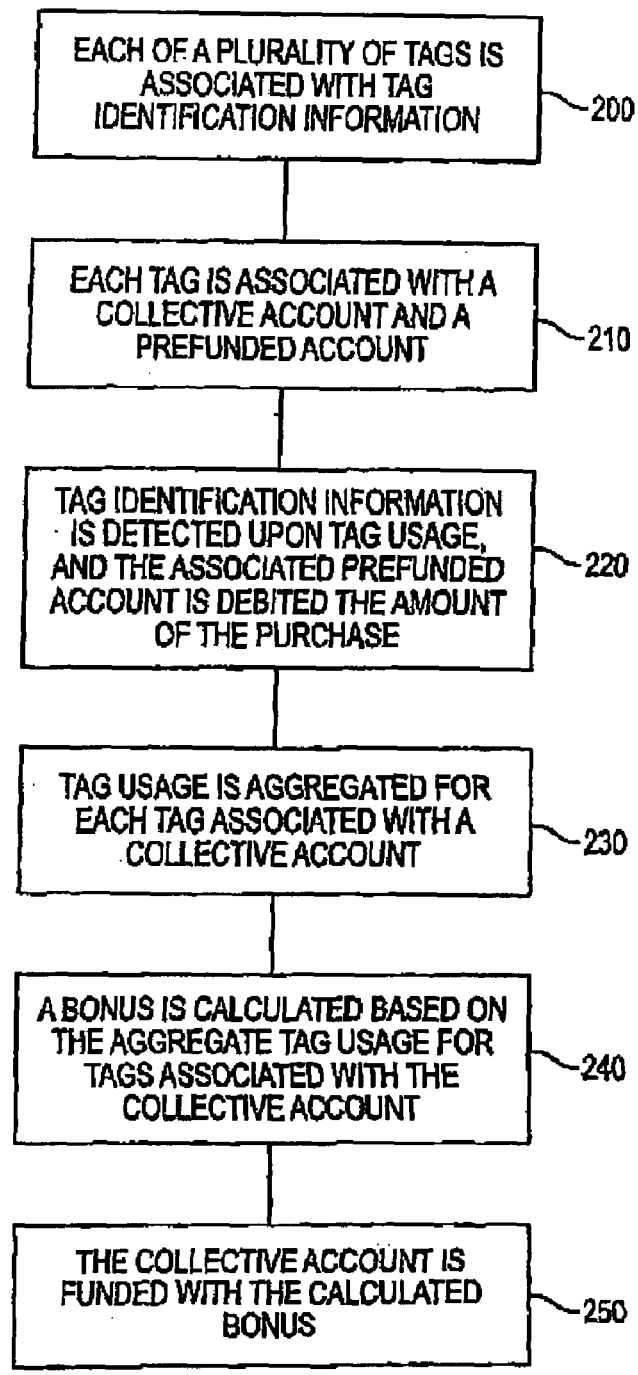
FIG. 2 is a flowscheme of one embodiment of the invention.

A flowscheme of one embodiment of the invention is shown in FIG. 2. At 200, each tag is associated with some tag identification information, which could be detected in various manners as IR or RF transmissions or bar code scanners. At 210, each tag is associated with a prefunded account within the ETC system as well as at least one collective account. When the tag identification information is detected by a reader/antenna during tag usage at 220, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. Tag usage, or portion of tag usage, can be aggregated for each tag associated with the collective account at 230. At 240, a bonus or reward can be calculated based on aggregate tag usage for a collective account, which is credited to the collective account at 250.

Figure 3:
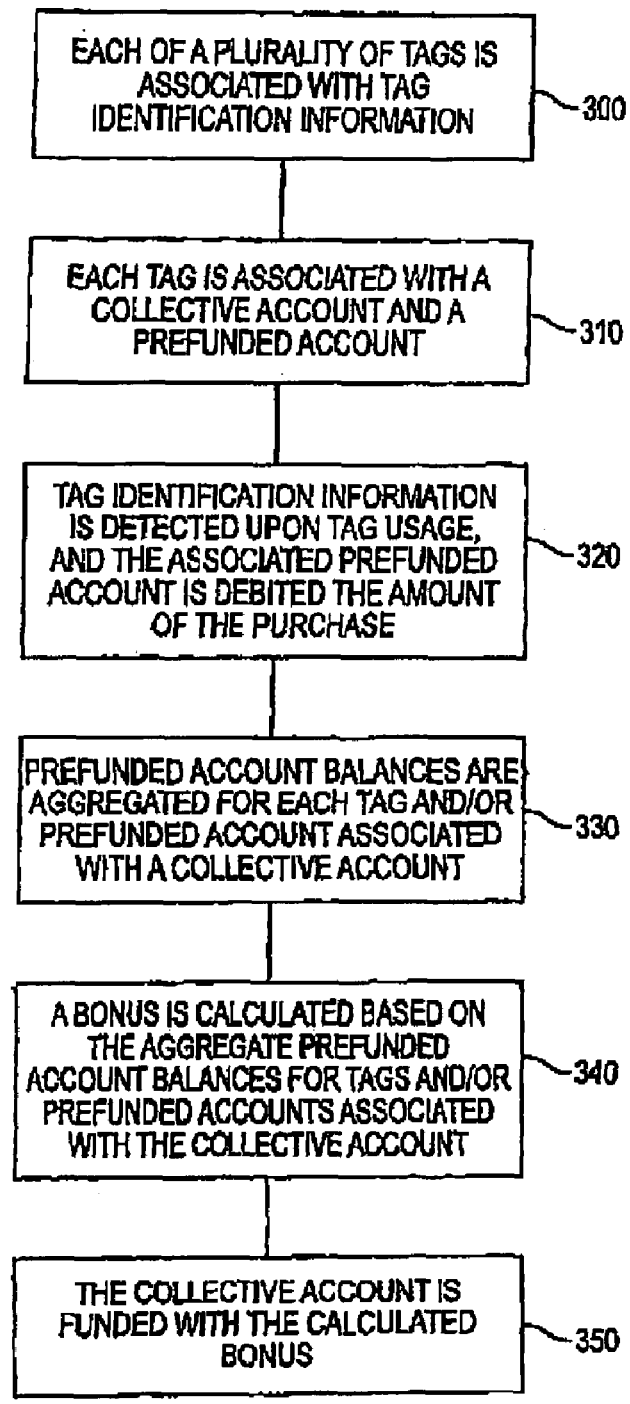
FIG. 3 is a flowscheme of an alternative embodiment of the invention

A flowscheme of an alternative embodiment of the invention is shown in FIG. 3. At 300, each tag is associated with some tag identification information, which could be detected in various manners as IR or RF transmissions or bar code scanners. At 310, each tag is associated with a prefunded account within the ETC system as well as at least one collective account. When the tag identification information is detected by a reader/antenna during tag usage at 320, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. On some periodic basis, prefunded account balances can be aggregated for each prefunded account associated directly with, or indirectly through a tag with, the collective account at 330. At 340, a bonus or reward can be calculated based on aggregate prefunded account balances for a collective account, which is credited to the collective account at 350.

Figure 4:
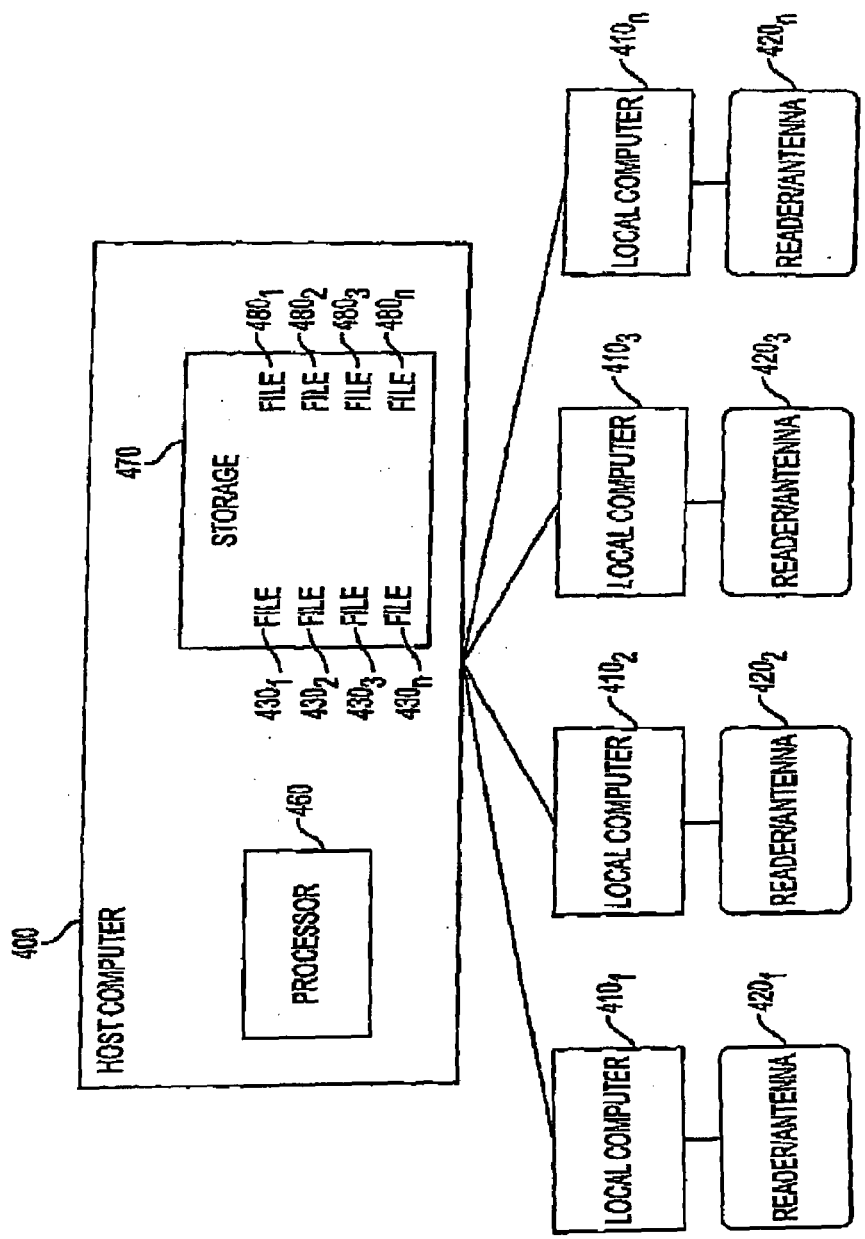
FIG. 4 is a schematic of a computer-based system for funding a collective account.

Referring to FIG. 4, one embodiment of a computer-based system for funding a collective account is described. The ETC system may have a host computer 400, a plurality of remote computers $410_1$ through $410_n$, and a plurality of reader/antennas $420_1$ through $420_n$ associated with remote computers $410_1$ through $410_n$. The host computer has a processor 460 capable of programmed response, and also has a storage unit 470, which may comprise a hard drive or other magnetic, solid state or other storage media, for storing applications, data, operating system and other information.

Upon or anytime after tagholder enrollment with the ETC, searchable indexed computer files $430_1$ through $430_n$ are created by the host computer processor 460 for each enrolled tagholder and stored in the host computer storage 470. The files $430_1$ through $430_n$ may contain such information as an individual tagholder's name, address, tag identification information, prefunded account information, tag usage, and selected collective account(s). The files $430_1$ through $430_n$ may also contain information identifying individual accounts that may be used to replenish the prefunded account balances. Each account can be indexed by the tag identification information, name, and selected collective account. Also, files $480_1$ through $480_n$ may be created by processor 460 and stored in storage 470 containing information for a plurality of collective accounts.

A plurality of readers/antenna $420_1$ through $420_n$ may be located at remote locations from the host computer 400 at the sights where the tagholders use the tags to purchase goods or services. The tag can transmit or is otherwise detectable to provide the tag identification information. Each reader/antenna $420_n$ may be associated with and capable of communicating with a remote computer $410_n$, where each remote computer is capable of communicating with and transmitting information to and receiving information from the host computer 400. In addition, each local computer $410_n$ may also have a processor capable of programmable response and storage capability.

When a tag is detected by the reader/antenna $420_n$ for a purchase of a good or a service, tag identification information can be recorded in the local computer $410_n$ along with the amount of the charge. Either in real time or on a periodic basis, the local computer $410_n$ can communicate with the host computer 400 and transmit the detected tag identification information along with the associated charge amount. Using the tag identification information, the host computer 400 can access the file $430_n$ indexed by that tag identification information, and debit the prefunded account associated with that file for the charge amount.

Either in real time or on a periodic basis, the processor 460 of the host computer 400 can access all tags and/or prefunded accounts that are associated with a certain collective account $480_n$ and either aggregate the total tag usage or the "float" of the prefunded account balances for the prefunded accounts associated with that collective account. A reward can be calculated based on these aggregates, and the processor 460 can initiate a funds transfer in an amount equal to the reward to the collective account $480_n$.

The foregoing embodiments have been presented for the purpose of illustration and description only and are not to be construed as limiting the scope of the invention in any way. The scope of the invention is to be determined from the claims appended hereto.

What is claimed is:

1. A method for distributing a reward, comprising:
associating by a financial institution an RFID tag with an individual account, the financial institution and at least one organization, wherein a tagholder is the holder of the individual account, wherein further the financial institution comprises one or more host computers;
aggregating by the financial institution purchase amounts for purchases made from a plurality of merchants using the individual account as a payment source;
determining by the financial institution if any of the purchases that were made using the individual account as a payment source were made by presenting the RFID tag to merchants;
aggregating by the financial institution purchase amounts for purchases made from a plurality of merchants by presenting the RFID tag to merchants;
calculating by a host computer a reward based at least in part on RFID tag usage; and
attributing by the financial institution the reward to an account associated with the at least one organization, wherein the organization comprises a business organization, a trade organization, a political party, a religious organization, an athletic organization, a professional society, an educational organization, a charitable organization a fund-raising organization, or a governmental organization, or combinations thereof.

2. The method of claim 1, wherein RFID tag usage comprises the purchase amount of a purchase of at least one of goods or services from a merchant when the RFID tag is presented to the merchant at time of purchase, the number of uses of the RFID tag to enable a purchase, the number of uses of the RFID tag to facilitate access to an ATM device or combinations therein.

3. The method of claim 2, wherein the reward is based at least in part on information supplied by the at least one organization.

4. The method of claim 1, wherein the RFID tag is branded with a symbol, name, colors or combinations thereof generally associated with the at least one organization.

5. The method of claim 1, wherein the REID tag comprises a sound generating device.

6. The method of claim 1, wherein the reward comprises cash, airline miles, reward points, services, goods, rebates, up front payments, statement credit, discounts, interest or combinations thereof.

7. The method of claim 1, wherein the tagholder selects the organization.

8. The method of claim 1, wherein the RFID tag comprises an LED or an LCD controllable via the tagholder.

9. The method of claim 1, wherein the RFID tag comprises at least one communication port allowing the tag to communicate with other devices.

10. The method of claim 1, wherein the RFID tag comprises at least one of a smart card, a plastic card, a bar coded sticker, a transponder readable by a reader/antenna, or combinations thereof.

11. The method of claim 1, wherein the individual account comprises a credit account, a debit account, a stored value account, a home equity line of credit account, a mutual fund account, a money market account, a savings account, a checking account a nonchecking deposit account, a telephone card account, a rewards account, a special premises account for use by employees of an entity or a margin account.

12. The method of claim 1, wherein the reward is one of automatically distributed to the account substantially upon RFID tag usage or automatically distributed to the account periodically.

13. The method of claim 1, wherein the RFID tag is embedded in a key, a fob, a token, a pager, a watch, a PDA, a cellular phone, clothing or a plastic card.

14. The method of claim 1, wherein the REID tag is one of physically presented to the merchant at a point of sale device, physically presented at a place of business, presented to the merchant over a network, presented to the merchant over a telephone connection or physically presented to facilitate access to an ATM machine.

15. The method of claim 1, further comprising:
associating the RFID tag with at least one prefunded account, wherein the prefunded account has a balance;
maintaining at least one of the prefunded accounts; and
debiting the balance of at least one of the prefunded accounts in an amount related to RFID tag usage.

16. A system for distributing a reward, comprising:
a central processor of a financial institution configured to associate an RFID tag with an individual account, the financial institution and at least one organization, wherein the tagholder is the holder of the individual account, wherein further the financial institution comprises one or more host computers,
wherein the host computer is configured to aggregate purchase amounts for purchases made from a plurality of merchants using the individual account as a payment source;
wherein the host computer is further configured to determine if any of the purchases that were made using the individual account as a payment source were made by presenting the RFID tag to merchants and then to aggregate purchase amounts for purchases from a plurality of merchants that were made by resenting the RFID tag to merchants;
wherein further the host computer is configured to calculate a reward based at least in part on RFID tag usage;
wherein the reward is attributed by the financial institution to an account that is associated with the at least one organization, wherein the organization comprises a business organization, a trade organization, a political party, a religious organization, an athletic organization, a professional society, an educational organization, a charitable organization, a fund-raising organization, or a governmental organization, or combinations thereof.

17. The system of claim 16, wherein RFID tag usage comprises the purchase amount of a purchase of at least one of goods or services from a merchant when the REID tag is presented to the merchant at time of purchase, the number of uses of the RFID tag to enable a purchase, the number of uses of the RFID tag to facilitate access to an ATM device, or combinations therein.

18. The system of claim 17, wherein the reward is based at least in part on information supplied by the at least one organization.

19. The system of claim 16, wherein the RFID tag is branded with a symbol, name, colors or combinations thereof generally associated with the at least one organization.

20. The system of claim 16, wherein the RFID tag comprises a sound generating device.

21. The system of claim 16, wherein the reward comprises cash, airline miles, reward points, services, goods, rebates, up front payments, statement credit, discounts, interest or combinations thereof.

22. The system of claim 16, wherein the tagholder selects the organization.

23. The system of claim 16, wherein the RFID tag comprises an LED or an LCD controllable via the tagholder.

24. The system of claim 16, wherein the RFID tag comprises at least one communication port allowing the tag to communicate with other devices.

25. The system of claim 16, wherein the RFID tag comprises at least one of a smart card, a plastic card, a bar coded sticker, a transponder readable by a reader/antenna, or combinations thereof.

26. The system of claim 16, wherein the individual account comprises a credit account, a debit account, a stored value account, a home equity line of credit account, a mutual fund account, a money market account, a savings account, a checking account, a nonchecking deposit account, a telephone card account, a rewards account, a special premises account for use by employees of an entity or a margin account.

27. The system of claim 16, wherein the processor is further programmed to automatically distribute the reward to the account substantially upon RFID tag usage or to automatically distribute the reward to the account periodically.

28. The system of claim 16, wherein the RFID tag is embedded in a key, a fob, a token, a pager, a watch, a PDA, a cellular phone, clothing or a plastic card.

29. The system of claim 16, wherein the RFID tag is one of physically presented to the merchant at a point of sale device, physically presented at a place of business, presented to the merchant over a network, presented to the merchant over a telephone connection or physically presented to facilitate access to an ATM machine.

30. The system of claim 16, wherein the RFID tag is associated with at least one prefunded account, wherein the prefunded account has a balance, wherein further the balance of the prefunded account is debited in an amount related to RFID tag usage.

* * * * *